United States Patent [19]

Shirai et al.

[11] Patent Number: 5,510,708
[45] Date of Patent: Apr. 23, 1996

[54] VARIABLE RELUCTANCE ROTATION SENSOR WITH LEAKAGE MAGNETIC FLUX SENSING

[75] Inventors: Takeshi Shirai, Pendleton, Ind.; Andrzej M. Pawlak, Troy, Mich.; Alan H. Green, Anderson, Ind.

[73] Assignee: General Motors Corporation, Detroit, Mich.

[21] Appl. No.: 326,616

[22] Filed: Oct. 20, 1994

[51] Int. Cl.⁶ .................. G01P 3/488; B60T 8/32
[52] U.S. Cl. .............. 324/174; 188/181 R; 310/168; 324/207.25
[58] Field of Search .................. 324/163, 173, 324/174, 207.15, 207.25; 310/155, 168; 188/181 R; 318/653; 384/448

[56] References Cited

U.S. PATENT DOCUMENTS

| | | | |
|---|---|---|---|
| 3,619,678 | 11/1971 | Ruof | 310/155 X |
| 3,947,711 | 3/1976 | Presley et al. | 310/155 |
| 4,461,994 | 7/1984 | MacDonald | 324/174 |
| 4,636,674 | 1/1987 | Peterson | 310/155 |
| 4,700,133 | 10/1987 | Day | 324/208 |
| 4,969,753 | 11/1990 | Kato et al. | 384/448 |
| 5,003,259 | 3/1991 | Palazzetti et al. | 324/174 X |
| 5,019,774 | 5/1991 | Rosenberg | 324/207.25 X |
| 5,023,546 | 6/1991 | Pawlak et al. | 324/174 |
| 5,023,547 | 6/1991 | Pawlak et al. | 324/174 |
| 5,183,341 | 2/1993 | Ouchi et al. | 384/446 |
| 5,287,738 | 2/1994 | Polinski et al. | 73/118.1 |

*Primary Examiner*—Gerard R. Strecker
*Attorney, Agent, or Firm*—Timothy G. Gorbatoff

[57] ABSTRACT

A variable reluctance rotation sensor comprising a flux member having a ferromagnetic pole piece formed of a cylindrical center portion interposed between a first and second end portion. Each of the end portions have a respective surface which contains elongated teeth, similarly separated by slots as teeth on the periphery of a toothed wheel. The cylindrical center portion is positioned with respect to the toothed wheel such that the toothed surfaces of the first and second end portions are positioned adjacent the periphery of the toothed wheel comprising the teeth and slots, the magnetic flux member and toothed wheel defining an air gap. The sensor further comprises permanent magnets which establish main flux loops traversing the air gap, and leakage flux loops linking an electrical coil wound about the cylindrical center portion. As the toothed wheel is rotated, the magnitude of the main flux loops vary in relation to the varying air gap. The leakage flux loops, in turn, vary in relation to the varying main flux loops, the varying leakage flux loops being linked to the electrical coil and resulting in a sinusoidal output voltage signal proportional to the varying leakage flux loops. Each cycle of the output signal corresponds to a predetermined incremental angular rotation of the toothed wheel.

4 Claims, 4 Drawing Sheets

VARIABLE RELUCTANCE ROTATION SENSOR WITH LEAKAGE MAGNETIC FLUX SENSING

The present invention relates to a variable reluctance rotation sensor which generates a high output signal at very low rotational speeds. Such a sensor would find particular utility in a vehicle anti-lock braking or traction control system.

BACKGROUND OF THE INVENTION

A variable reluctance rotation sensor of the prior art may typically comprise a rotatable toothed magnetic wheel and a stationary sensor unit having a permanent magnet for establishing a main flux loop. The toothed wheel and sensor unit define an air gap across which the main flux loop passes. The main flux loop also passes through a multi-turn electrical coil which generates an output voltage proportional to the rate of change of the main flux.

The toothed wheel comprises teeth, separated by slots, angularly spaced along its periphery. As the toothed wheel rotates, the air gap varies between a small air gap when the sensor unit is aligned with a tooth, and a larger air gap when the sensor unit is aligned with a slot. The air gap variations cause variations in the magnitude of the main flux loop passing through (linking) the electrical coil. The coil generates a sinusoidal output voltage signal having a maximum voltage signal each time the sensor unit is aligned with a tooth, and a minimum voltage signal each time it is aligned with a slot.

The amplitude of the signal in a variable reluctance rotation sensor of the prior art is dependant upon, among other factors, the size and strength (energy product) of the permanent magnet. Modern anti-lock braking and traction control systems require vehicle wheel speed data. This necessitates incorporation of a rotational sensor in a limited space, such as a vehicle wheel bearing. In order for the sensor to be small enough to meet packaging requirements, yet generate sufficiently high output voltage signals, expensive high strength rare earth permanent magnets are required, significantly adding to the cost of the rotational sensing device.

Additionally, the amplitude of the sensor signal decreases with rotational speed since the rate of change of flux due to air gap variation decreases as the tooth moves more slowly past the stationary member. Therefore, small inexpensive variable reluctance rotation sensors generating a high output at very low rotational speeds are not readily available.

SUMMARY OF THE INVENTION

The present invention is directed to a small inexpensive variable reluctance rotation sensor which generates a high output at low rotational speeds, and therefore provides an improved rotational speed signal over those of the prior art for use in vehicle anti-lock braking and traction control systems. Whereas variable reluctance sensors of the prior art are designed to sense variations in the magnitude of the main flux loop linking all of the turns of the electrical coil, the variable reluctance rotation sensor of the present invention is designed to sense variations in a resultant leakage flux linking only portions of the electrical coil. No main flux loop passes through the electrical coil turns.

According to one aspect of the present invention, a magnetic flux member is comprised of a ferromagnetic pole piece formed of a cylindrical center portion interposed between a first and second end portion. The cylindrical center portion supports a multi-turn electrical coil wound thereon. Each of the first and second end portions have a respective surface which contains multiple elongated teeth, similarly separated by slots as the teeth on the periphery of the toothed wheel. The elongated teeth are of a similar size and shape as the teeth on the toothed wheel periphery.

The cylindrical center portion is positioned with respect to the toothed wheel such that the toothed surfaces of the first and second end portions are positioned adjacent the teeth on the toothed wheel periphery. The toothed surface of the first and second end portions and the toothed wheel periphery define air gaps which vary as the toothed wheel rotates. An air gap is at a minimum when the teeth of the respective end portion are aligned with the teeth of the toothed wheel, and is at a maximum when the teeth of the respective end portion are aligned with the slots of the toothed wheel. The use of multiple elongated teeth on the end portions minimizes the effect of air gap variations due to wobbling of the rotating toothed wheel (e.g., axial offset) and bearing end play movement by effectively averaging the individual air gaps between each elongated tooth and the toothed wheel.

The elongated teeth are constructed such that when the elongated teeth of one of the first and second end portions are aligned with teeth on the toothed wheel, the elongated teeth of the other of the first and second end portions are aligned with slots on the toothed wheel. When the toothed wheel is rotated an incremental number of angular degrees equal to one-half the pitch between adjacent teeth on the toothed wheel, the elongated teeth of the one of the first and second end portions previously aligned with teeth on the toothed wheel are now aligned with slots, while the elongated teeth of the other of the first and second end portions previously aligned with slots on the toothed wheel are now aligned with teeth. Therefore, the tooth/slot relationship between the first and second end portions and the toothed wheel periphery alternates upon rotation of the toothed wheel by an incremental number of angular degrees.

The magnetic flux member also comprises a pair of permanent magnets, each of the permanent magnets having a pair of magnetic poles. Each one of the permanent magnets is adjoined to a different one of the first and second end portions, with similar poles adjoining to respective ones of the first and second end portions. The permanent magnet poles are orientated with opposing magnetic polarities with respect to one another such that they do not develop a common magnetic flux loop through the cylindrical center portion, linking all the turns of the electrical coil.

Each one of the permanent magnets establishes a main flux loop passing from the respective end portion to which it is adjoined, across the air gap, through the toothed wheel, and back to the permanent magnet. None of the main flux is linked to the electrical coil. The use of multiple elongated teeth also provides multiple flux paths, thereby increasing the overall magnetic field strength developed by the main flux loop. Additionally, each permanent magnet establishes a leakage flux loop which passes through the respective end portion to which it is adjoined, axially through a portion of the cylindrical center portion, radially through portions of the electrical coil and back to the permanent magnet.

For small air gaps (e.g., <1 mm), a majority of the magnetic flux generated by the permanent magnets (approximately 94–97%) comprises the main flux loop. The leakage flux comprises only a small portion (approximately 3–6%) of the total magnetic flux generated. The comparative magnitudes of the main and leakage flux loops are dependent upon the varying air gap, which is further dependent upon the alignment of the elongated teeth of the respective end portions with the teeth and slots on the periphery of the toothed wheel. For larger air gaps (e.g., >1 mm), the percentage of leakage flux would be significantly higher, with a lower overall total magnetic flux being developed (i.e., change in working point of permanent magnet depending upon proximity of surrounding ferromagnetic material).

Depending upon the proximity of surrounding ferromagnetic material, the respective magnitudes of the main and leakage flux loops will vary. When the elongated teeth of one of the first and second end portions are aligned with teeth on the toothed wheel, the respective air gap is at a minimum, resulting in an increase in the magnitude of the main flux loop of the corresponding permanent magnet (to approximately 97% of the total generated flux), and a resulting change in the distribution of and decrease in the magnitude of the leakage flux loop (to approximately 3%) linking the electrical coil.

Alternatively, when the elongated teeth of one of the first and second end portions are aligned with slots on the toothed wheel, the respective air gap is at a minimum, resulting in a decrease in the magnitude of the main flux loop of the corresponding permanent magnet (to approximately 94%) and a resulting change in the distribution of and increase in the magnitude of the leakage flux loop (to approximately 6%) linking the electrical coil.

Because of the opposing magnetic orientations of the leakage flux loops generated by the two permanent magnets, there exists a resultant leakage flux loop comprising the summation of the two signed, opposing individual leakage flux loops. The electrical coil generates a sinusoidal output voltage signal responsive to the change in the resultant leakage flux passing through the coil. As described above, although only leakage flux is utilized by the sensor to detect rotation, the relative changes in the individual leakage flux loops are substantial, making for an easily detectable varying resultant leakage flux. Due to the design of the present invention, a sufficiently strong output voltage signal is achieved by small, inexpensive, readily available ferrite magnets.

According to another aspect of the present invention, an additional pair of permanent magnets are incorporated into the sensor unit, similarly positioned with respect to the end portions as the first pair of permanent magnets. The additional permanent magnets develop main and leakage flux loops which aid the respective flux loops of the first pair of permanent magnets to increase the amplitude of the sinusoidal output voltage signal generated by the electrical coil.

DETAILED DESCRIPTION OF THE PREFERRED EMBODIMENT

Figure 1:
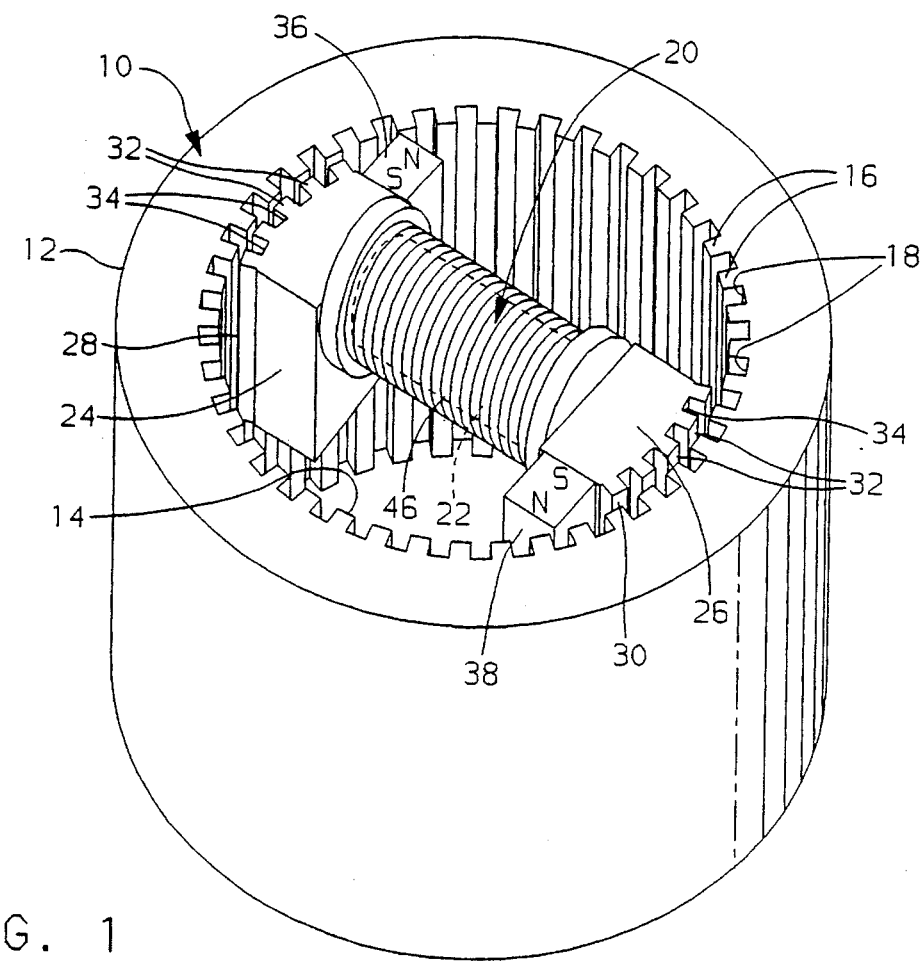
FIG. 1 illustrates a variable reluctance rotational sensor according to the present invention.

Referring to the drawings, and more particularly to FIG. 1, a cylindrical toothed wheel 10, defined by an outer periphery 12 and an inner periphery 14, is rotatably mounted in, for example, the wheel housing of a vehicle equipped with an anti-lock braking system. The toothed wheel 10 is engaged for rotation with one of the vehicle road wheels, the rotational speed of which being required. Toothed wheel 10 comprises, at its inner peripheral edge 14, a plurality of angularly spaced rectangular teeth 16. Teeth 16 are evenly spaced by slots 18 around the inner periphery 14 of the toothed wheel 10 and are substantially identical in size and shape. Toothed wheel 10 is generally formed of powdered ferromagnetic material for ease of manufacture. The intricacies of the toothed inner periphery 14 does not easily lend itself to machining operations.

Toothed wheel 10 is enclosed within a cover (not shown) which also encloses a sensor unit 20. The cover may be, although not necessarily, a grease cover for a wheel bearing unit. Sensor unit 20 is molded in a thermoplastic housing and press fit into a suitably formed recess in the cover. Sensor unit 20 is fixed in a stationary position with respect to the inner periphery 14 of the toothed wheel 10, wherein the toothed wheel teeth 16 and slots 18 pass adjacent diametrically opposed surfaces 28 and 30 of sensor unit 20.

The sensor unit 20 comprises a pole piece having a cylindrical center portion 22, interposed between a first end portion 24 and a second end portion 26. Both the first and second end portions 24 and 26 have respective outer diametrically opposed surfaces 28 and 30 with elongated teeth 32 and slots 34, such that as the toothed wheel 10 is rotated, the teeth 16 and slots 18 of the toothed wheel 10 pass adjacent the teeth 32 and slots 34 of the first and second end portions 24 and 26, respectively. The teeth 32 are similar in size and shape as the teeth 16 on the toothed wheel, and similarly separated by slots 34. A multi-turn electrical coil 46 is wound about the cylindrical center portion 22 of the pole piece for generating an output voltage signal indicative of incremental angular rotation of the toothed wheel.

Sensor unit 20 further comprises a pair of permanent magnets 36 and 38, each adjoining a different one of the first and second end portions 24 and 26. Each of the permanent magnets 36 and 38 have a north and south pole at opposite ends thereof. The permanent magnets poles are oriented with respect to one another such that they have a similar one of their respective north and south poles adjoining their respective first and second end portions. This results in the permanent magnets 36 and 38 having magnetically opposing polarities.

The teeth 32 and slots 34 of the respective first and second end portions 24 and 26 are constructed such that they are alternatively and opposingly aligned with teeth and slots 16 and 18 on the toothed wheel 10 as the toothed wheel rotates. That is, when the teeth 32 of the first end portion 24 are aligned with teeth 16 on the inner periphery 14 of the toothed wheel 10, the teeth 32 of the second end portion 26 are aligned with slots 18 on the inner periphery 14 of the toothed wheel 10. Conversely, when the teeth 32 of the first end portion 24 are aligned with slots 18 on the inner periphery 14 of the toothed wheel 10, the teeth 32 of the second end portion 26 are aligned with teeth 16 on the inner periphery 14 of the toothed wheel 10.

The permanent magnets 36 and 38 are magnetically in opposing relationship with respect to one another such that no common magnetic flux loop is established through the cylindrical center portion 22 of the pole piece. The total magnetic flux generated by each of the permanent magnets is comprised of two main components, a main flux loop and a leakage flux loop. For small air gap apparatuses (e.g., <1mm) the main flux loop comprises approximately 94–97% of the total magnetic flux generated by the permanent magnet, depending upon the air gap. Any magnetic flux which deviates from the main flux loop is termed leakage flux and comprises approximately 3–6% of the total magnetic flux, equally dependent upon the air gap.

Figure 2A:
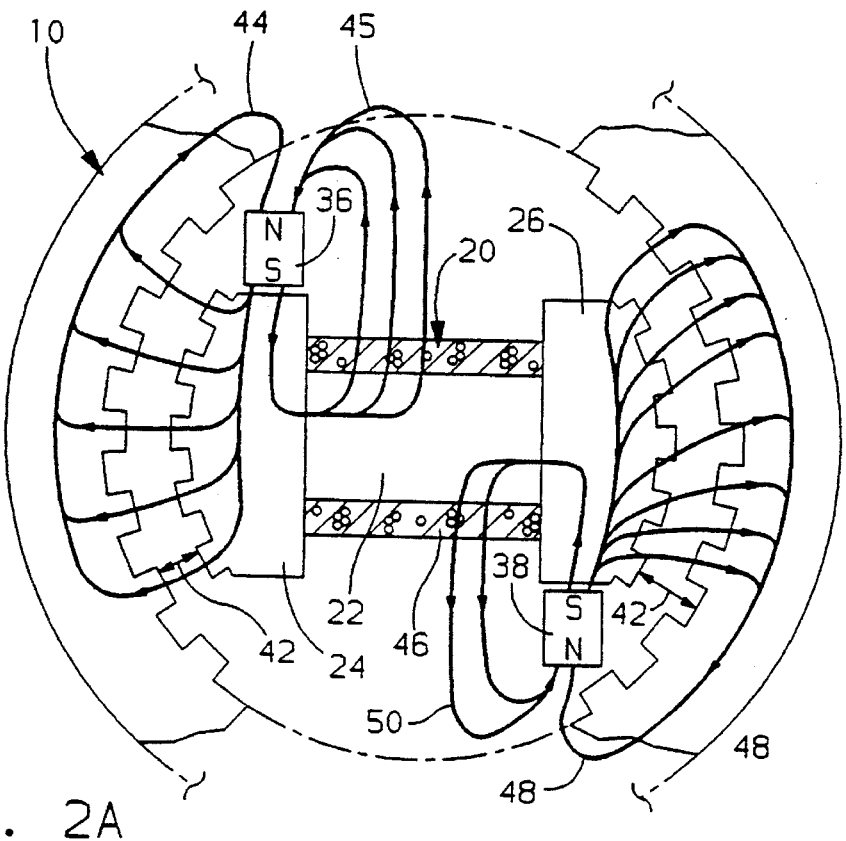
FIGS. 2A and 2B illustrate schematic sectional views of the sensor of FIG. 1, detailing main and leakage magnetic flux lines generated by the permanent magnets of FIG. 1.
Figure 2B:
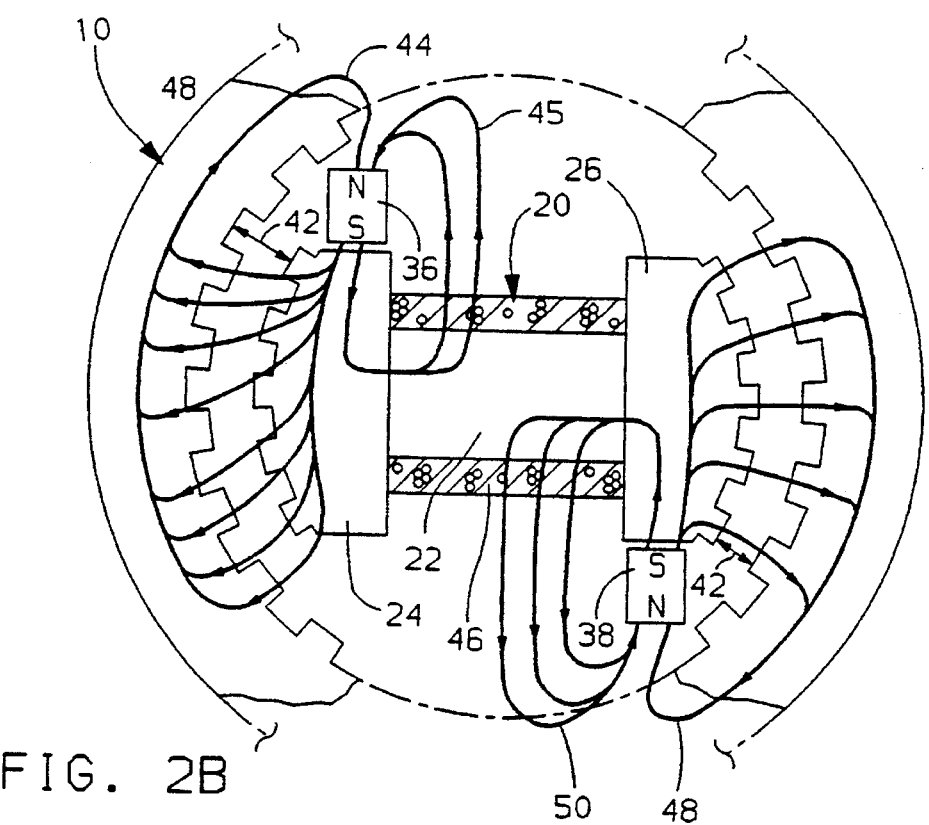

The magnetic flux loops generated by the permanent magnets 36 and 38 of FIG. 1 are illustrated in FIGS. 2A and 2B. Like parts, as those shown in FIG. 1, are denoted by like reference numerals, and repeated descriptions thereof are omitted.

Referring to FIG. 2A, an air gap 42 is defined by the toothed peripheries of the first and second end portions 24 and 26 and the toothed periphery of the toothed wheel 10. The permanent magnets 36 and 38 can be adjoined to any surface of the respective end portions 24 and 26. In FIG. 1, they are adjoined to a top surface of the end portions, whereas in FIGS. 2A and 2B they are adjoined to a side surface of the end portions. Although structurally different, functionally they are equivalent.

Permanent magnet 36 generates a main flux loop 44 defined by a path out of the south pole of the permanent magnet 36, through the first end portion 24, across the air gap 42, through the toothed wheel 10, and back into the north pole of the permanent magnet 36. As the main flux traverses the air gap 42, it travels a path of maximum permeance. That is, the path of the main flux travels through the teeth 32 of the first end portion 24, across the air gap 42 and into the teeth 16 of the toothed wheel 10.

The permanent magnet 36 additionally generates a leakage flux loop 45 defined by a path out of the south pole of the permanent magnet 36, through the first end portion 24, axially through a portion of the cylindrical center portion 22, radially through a multi-turn electrical coil 46 wound thereon, and back into the north pole of the permanent magnet 36.

Similarly, a main flux loop 48 generated by permanent magnet 38 is defined by a path out of the south pole of the permanent magnet 38, through the second end portion 26, across the air gap 42, through the toothed wheel 10, and back into the north pole of the permanent magnet 38. Because the sensor unit 20 is oriented with respect to the toothed wheel 10 such that the teeth 32 on the second end portion 26 are aligned with slots 18 on the toothed wheel 10, there is no path of maximum permeance between the second end portion 26 and the toothed wheel 10. Therefore, the main flux 48 traversing the air gap 42 is equally distributed along the entire surface of the second end portion 26.

A leakage flux loop 50 generated by the permanent magnet 38 is defined by a path out of the south pole of the permanent magnet 38, through the second end portion 26, axially through a portion of the cylindrical center portion 22, radially through the electrical coil 46 and back into the north pole of the permanent magnet 38.

Note that neither of the main flux loops 44 or 48 pass through the electrical coil 46. However, the leakage flux loops 45 and 50 opposingly pass through separate portions of the cylindrical center portion 22 and electrical coil 46. The distribution of the leakage flux loops 45 and 50 across the cylindrical center portion 22 and the electrical coil 46 will vary depending upon the varying air gaps.

The respective magnitudes of the main and leakage flux loops are dependent upon the magnitude of the air gap 42. In FIG. 2A, the elongated teeth 32 of the first end portion 24 are aligned with the teeth 16 of the toothed wheel 10, whereas, the elongated teeth 32 of the second end portion 26 are aligned with the slots 18 of the toothed wheel 10. Therefore, the air gap 42 between the first end portion 24 and the toothed wheel 10 is at a minimum whereas the air gap 42 between the second end portion 26 and the toothed wheel 10 is at a maximum. When the air gap 42 is at a minimum, the permeance of the magnetic path is at a maximum, resulting in a larger percentage of the total magnetic flux generated by the permanent magnet 36 and 38 travelling through the main flux loop.

As illustrated in FIG. 2A, the main flux loop 44 comprises approximately 97% of the total flux generated by permanent magnet 36, while the leakage flux loop 45 comprises only approximately 3% of the total flux of permanent magnet 36. Conversely, with respect to the magnetic flux generated by the other permanent magnet 38, the air gap 42 is at a maximum, minimizing the permeance of the respective magnetic path. Therefore, in this situation, the main flux loop 48 comprises approximately 94% of the total flux generated by permanent magnet 38 while the leakage flux loop 50 comprises the remaining 6% of the total flux.

FIG. 2B illustrates a converse of the rotational relationship of that of FIG. 2A, comprising an angular rotation of the toothed wheel 10 by an incremental number of angular degrees equal to one-half the angular distance (pitch) separating teeth 16 on the toothed wheel 10. According to FIG. 2B, the teeth 32 of the first end portion 24 are aligned with slots 18 on the toothed wheel 10 and the teeth 32 of the second end portion 26 are aligned with teeth 16 on the toothed wheel. The magnetic relationships are similar to those described above with respect to FIG. 2A, except that the main flux path of permanent magnet 38 traverses the air gap 42 between two opposingly aligned teeth 32 and 16, and the main flux path of the permanent magnet 36 traverses the air gap 42 between opposingly aligned teeth 32 and slots 18.

As the toothed wheel 10 rotates, the multi-turn electrical coil 46 generates a sinusoidal output voltage signal having a cycle corresponding to rotation of the toothed wheel by an incremental number of angular degrees. The amplitude of the output voltage signal varies in accordance with the rate of change of the resultant leakage flux passing through the electrical coil 46, consisting of a summation of the individual signed, magnetically opposing leakage flux loops 45 and 50 generated by permanent magnets 36 and 38, respectively.

Figure 3:
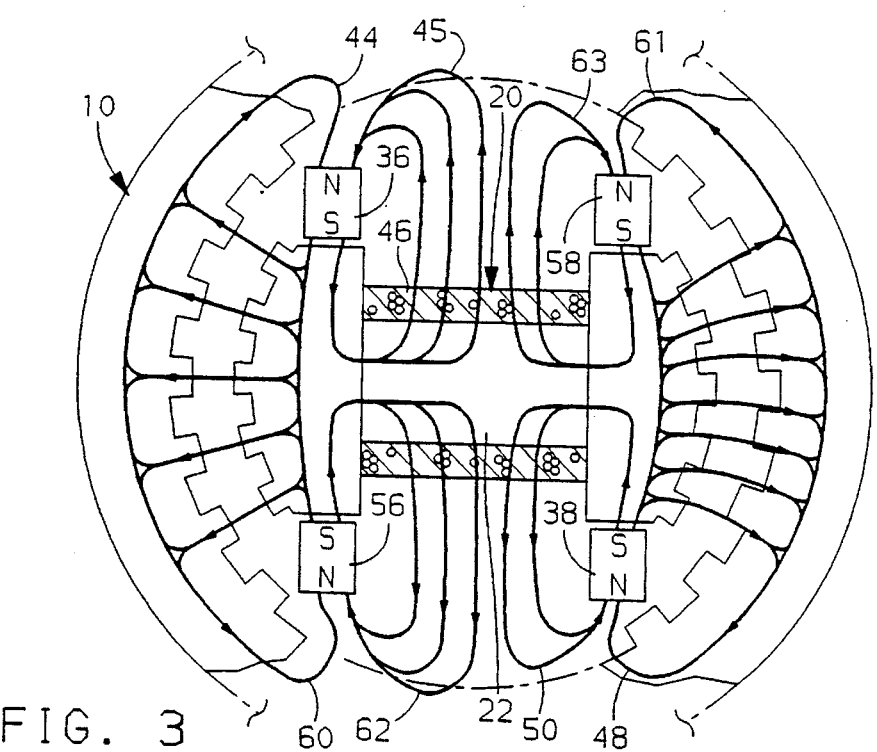
FIG. 3 illustrates an alternative embodiment of the sensor of FIG. 1, comprising four permanent magnets.

FIG. 3 illustrates an alternative embodiment of the sensor unit 20 of FIG. 1 comprising additional pairs of permanent magnets. Referring to FIG. 3, the sensor unit 20 comprises an additional pair of permanent magnets 56 and 58, each of the permanent magnets adjoining a different one of the first and second end portions 24 and 26 of the pole piece. Each of the additional permanent magnets 56 and 58 has a corresponding north and south pole, a similar one as that of the first pair of permanent magnets 36 and 38 being orientated adjacent their respective adjoining first and second end portions 24 and 26. The additional permanent magnets 56 and 58 are oriented to have opposing magnetic polarities with respect to one another for generating main and leakage flux loops 60, 61, 62 and 63 which aid the corresponding main and leakage flux loops 44, 45, 48 and 50 of the first pair of permanent magnets 36 and 38 for amplifying the output voltage signal generated by the electrical coil 46.

Figure 4A:
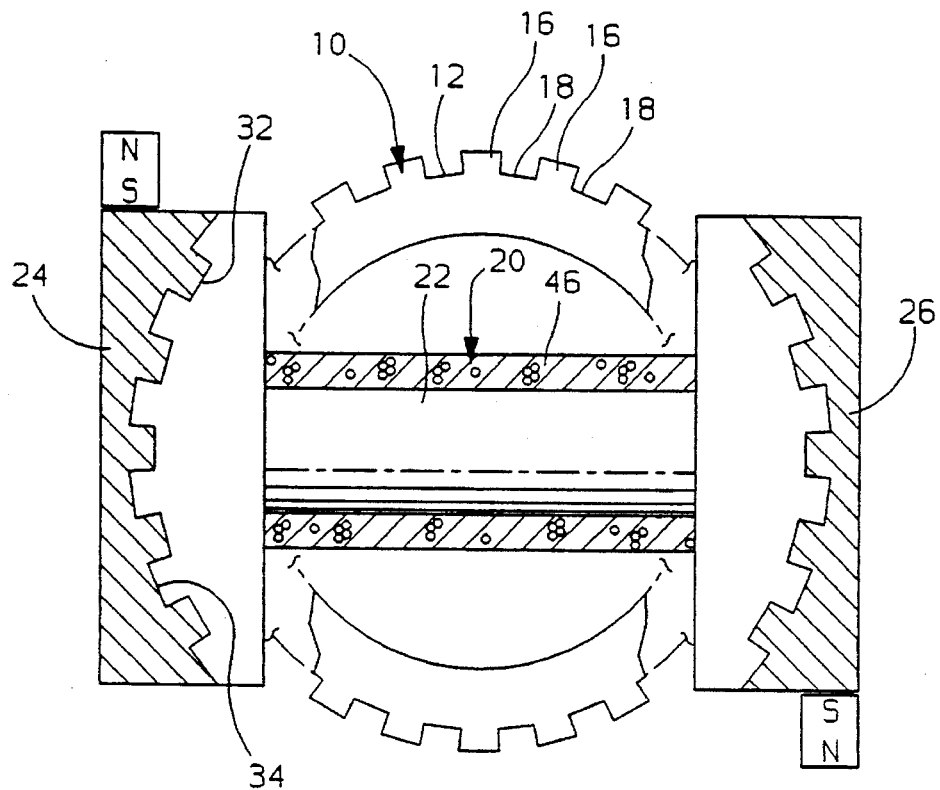
FIGS. 4A–C illustrate an alternative embodiment of the rotational sensor of FIG. 1, comprising a toothed wheel having teeth, separated by slots, angularly spaced along an outer periphery.
Figure 4B:
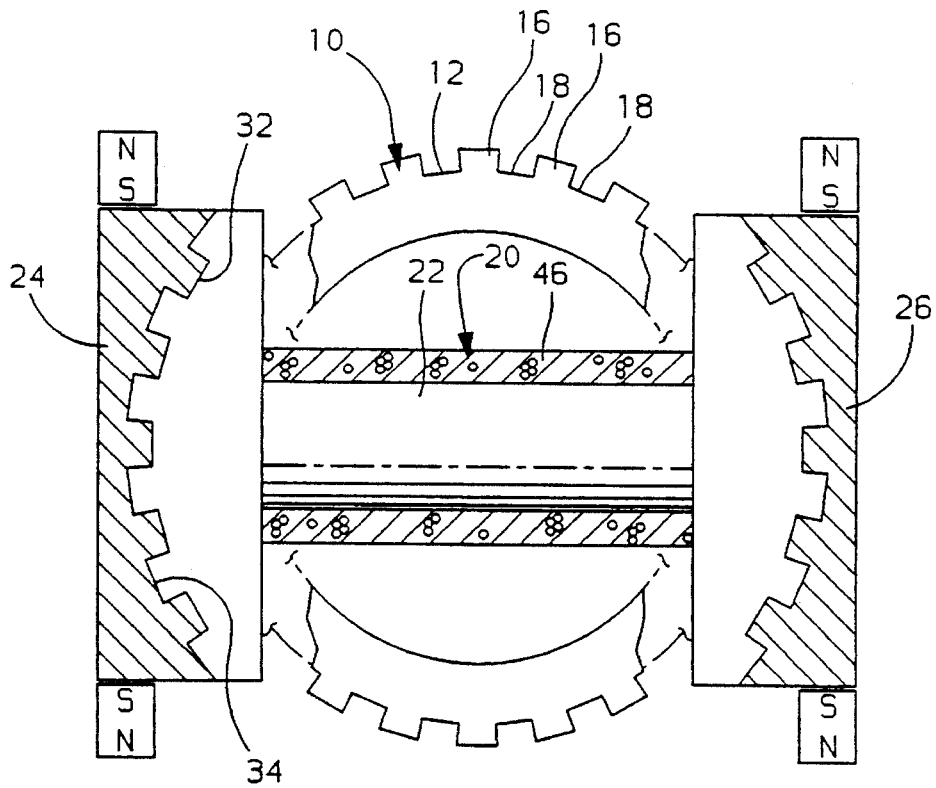
Figure 4C:
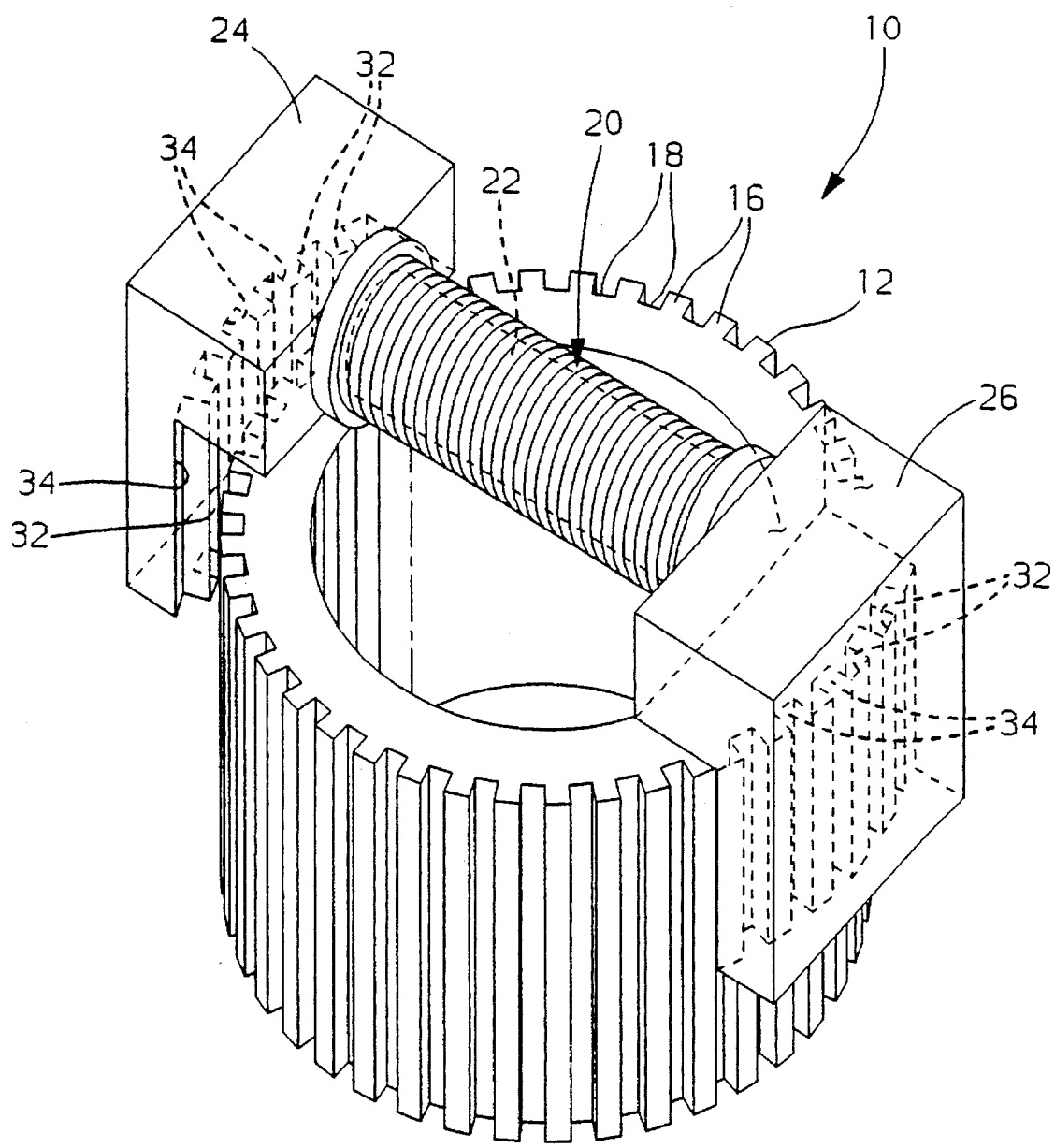

FIGS. 4A–C illustrate an alternative embodiment in which the teeth 16 and slots 18 of the toothed wheel 10 are circumferentially spaced along the outer periphery 12 of the toothed wheel. According to this embodiment, the pole piece has elongated teeth 32 and slots 34 along facially opposing surfaces of the first and second end portions 24 and 26. Additionally, as illustrated in FIG. 4B, there may be more than one pair of permanent magnets, depending upon the required strength of the desired electrical signal. FIG. 4C illustrates a perspective view of the toothed wheel 10 and pole piece 20 configuration of the alternative embodiment of FIGS. 4A and 4B.

While the present invention has been described in reference to the illustrated embodiments, it will be recognized that various modifications will occur to those skilled in the art. In this regard, it will be understood that sensors incorporating such modifications may fall within the scope of this invention, which is defined by the appended claims.

The embodiments of this invention in which an exclusive property or privilege is claimed are defined as follows:

1. A variable reluctance rotation sensor comprising:

a ferromagnetic toothed wheel rotatable about an axis, the toothed wheel having teeth separated by slots angularly spaced along its outer periphery;

a ferromagnetic pole piece having a cylindrical center portion interposed between a first and second end portion, the first and second end portions each having a toothed surface facially opposing the toothed surface of the other of the first and second end portion, the toothed surfaces having elongated teeth separated by slots, the pole piece being oriented with respect to the toothed wheel such that the elongated teeth of the first and second end portions are adjacent the outer periphery of the toothed wheel, the elongated teeth of the first and second end portions and the toothed wheel periphery defining an air gap such that the elongated teeth of the first and second end portions are alternatively and opposingly aligned with teeth and slots along the outer periphery of the toothed wheel as the toothed wheel rotates, the elongated teeth of one of the first and second end portions being opposingly aligned with teeth of the toothed wheel upon every rotation of the tooted wheel by an incremental number of angular degrees:

a first pair of permanent magnets, each one of the first pair of permanent magnets adjoining a different one of the first and second end portions and having a pair of poles with a similar one of its pair of poles adjacent the respective one of the first and second end portions to which it is adjoined, the first pair of permanent magnets having opposing magnetic polarities with respect to one another; and a multi-turn electrical coil wound about the cylindrical center portion of the pole piece, wherein each of the first pair of permanent magnets generates (i) a main flux loop defined by a path through the respective one of the first and second end portions to which it is adjoined, across the air gap, through the toothed wheel and back to the permanent magnet, and (ii) a leakage flux loop defined by a path through the respective one of the first and second end portions to which it is adjoined, axially through a portion of the cylindrical center portion, radially through the multi-turn electrical, and back to the permanent magnet, the multi-turn electrical coil generating an output voltage signal responsive to a change in a resultant leakage flux passing through the multi-turn electrical coil, each signal cycle corresponding to an incremental angular rotation of the toothed wheel, the resultant leakage flux being a summation of the leakage flux loops generated by the first pair of permanent magnets.

2. The variable reluctance rotation sensor according to claim 1, further comprising an additional pair of permanent magnets, each one of the additional permanent magnets having a pair of poles with a similar one of its pair of poles as the first pair of permanent magnets adjacent different ones of the first and second end portions, wherein each one of the additional permanent magnets are oriented to have an opposing polarity with the remaining one of the additional permanent magnets, the additional pair of permanent magnets generating similar main and leakage magnetic flux loops additive to the respective main and leakage flux loops of the first pair of permanent magnets for amplifying the output voltage signal.

3. A variable reluctance rotation sensor comprising:

a ferromagnetic toothed wheel rotatable about an axis, the toothed wheel having a hollowed cylindrical shape defined by an inner and outer periphery, the toothed wheel further having teeth separated by slots angularly spaced along its inner periphery;

a ferromagnetic pole piece having a cylindrical center portion interposed between a first and second end portion, the first and second end portions each having a toothed surface diametrically opposing the toothed surface of the other of the first and second end portion, the toothed surfaces having elongated teeth separated by slots, the pole piece being oriented with respect to the toothed wheel such that the elongated teeth of the first and second end portions are adjacent the inner periphery of the toothed wheel, the elongated teeth of the first and second end portions and the toothed wheel periphery defining an air gap such that the elongated teeth of the first and second end portions are alternatively and opposingly aligned with teeth and slots along the inner periphery of the toothed wheel as the toothed wheel rotates, the elongated teeth of one of the first and second end portions being opposingly aligned with teeth of the toothed wheel upon every rotation of the tooted wheel by an incremental number of angular degrees;

a first pair of permanent magnets, each one of the first pair of permanent magnets adjoining a different one of the first and second end portions and having a pair of poles with a similar one of its pair of poles adjacent the respective one of the first and second end portions to which it is adjoined, the first pair of permanent magnets having opposing magnetic polarities with respect to one another; and a multi-turn electrical coil wound about the cylindrical center portion of the pole piece, wherein each of the first pair of permanent magnets generates (i) a main flux loop defined by a path through the respective one of the first and second end portions to which it is adjoined, across the air gap, through the toothed wheel and back to the permanent magnet, and (ii) a leakage flux loop defined by a path through the respective one of the first and second end portions to which it is adjoined, axially through a portion of the cylindrical center portion, radially through the multi-turn electrical, and back to the permanent magnet, the multi-turn electrical coil generating an output voltage signal responsive to a change in a resultant leakage flux passing through the multi-turn electrical coil, each signal cycle corresponding to an incremental angular rotation of the toothed wheel, the resultant leakage flux being a summation of the leakage flux loops generated by the first pair of permanent magnets.

4. The variable reluctance rotation sensor according to claim 3, further comprising an additional pair of permanent magnets, each one of the additional permanent magnets having a pair of poles with a similar one of its pair of poles as the first pair of permanent magnets adjacent different ones of the first and second end portions, wherein each one of the additional permanent magnets are oriented to have an opposing polarity with the remaining one of the additional permanent magnets, the additional pair of permanent magnets generating similar main and leakage magnetic flux loops additive to the respective main and leakage flux loops of the first pair of permanent magnets for amplifying the output voltage signal.

* * * * *